US012288032B2

(12) United States Patent
Kale et al.

(10) Patent No.: US 12,288,032 B2
(45) Date of Patent: *Apr. 29, 2025

(54) SECURE COMPLETE PHRASE UTTERANCE RECOMMENDATION SYSTEM

(71) Applicant: Salesforce, Inc., San Francisco, CA (US)

(72) Inventors: Anuprit Kale, Oakland, CA (US); Weiping Peng, San Francisco, CA (US); Na Cheng, San Francisco, CA (US); Rick Lindstrom, San Francisco, CA (US); Zachary Alexander, Snoqualmie, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,077

(22) Filed: Oct. 31, 2023

(65) Prior Publication Data

US 2024/0062010 A1    Feb. 22, 2024

Related U.S. Application Data

(63) Continuation of application No. 17/099,083, filed on Nov. 16, 2020, now Pat. No. 11,836,450.

(Continued)

(51) Int. Cl.
*G06F 40/289* (2020.01)
*G06F 16/31* (2019.01)

(Continued)

(52) U.S. Cl.
CPC ........... *G06F 40/289* (2020.01); *G06F 16/31* (2019.01); *G06F 16/3329* (2019.01);
(Continued)

(58) Field of Classification Search
CPC .... G06F 40/289; G06F 16/31; G06F 16/3329; G06F 16/3344; G06F 16/3347; G06F 40/30; G06F 16/337; G06N 20/00
See application file for complete search history.

(56) References Cited

U.S. PATENT DOCUMENTS 9,529,488 B2    12/2016  Beechuk et al.
9,710,613 B2 *   7/2017  Suskind ................. G09B 19/04
(Continued)

FOREIGN PATENT DOCUMENTS

WO    2019089229 A1    5/2019

OTHER PUBLICATIONS

U.S. Appl. No. 17/099,083, Non Final Office Action mailed Mar. 30, 2023, 14 pgs.
(Continued)

*Primary Examiner* — Linda Wong
(74) *Attorney, Agent, or Firm* — Polygon IP, LLP

(57) ABSTRACT

Described herein are systems, apparatus, methods and computer program products for machine learning intent classification. In various embodiments, historical utterances provided by users may be utilized for bot training. Context and personally identifiable information may be removed from the utterances. The utterances may be associated with vectors. The utterances and vectors may be used to determine recommendations.

20 Claims, 10 Drawing Sheets

Related U.S. Application Data

(60) Provisional application No. 62/936,967, filed on Nov. 18, 2019.

(51) Int. Cl.
  *G06F 16/3329* (2025.01)
  *G06F 16/334* (2025.01)
  *G06F 40/30* (2020.01)

(52) U.S. Cl.
  CPC ...... *G06F 16/3344* (2019.01); *G06F 16/3347* (2019.01); *G06F 40/30* (2020.01)

(56) References Cited

U.S. PATENT DOCUMENTS

| | | | |
|---|---|---|---|
| 10,496,844 B2 | 12/2019 | Rickard, Jr. et al. | |
| 10,546,064 B2* | 1/2020 | Cannings | G06F 40/211 |
| 10,552,432 B2 | 2/2020 | Govindarajan et al. | |
| 10,565,265 B2 | 2/2020 | Alexander et al. | |
| 10,614,061 B2 | 4/2020 | Kempf et al. | |
| 10,628,431 B2 | 4/2020 | Chittar et al. | |
| 10,671,658 B2* | 6/2020 | Case | G06F 16/489 |
| 10,803,127 B2 | 10/2020 | Alexander et al. | |
| 10,824,814 B2 | 11/2020 | Faizakof et al. | |
| 11,501,753 B2 | 11/2022 | Shen et al. | |
| 11,836,450 B2 | 12/2023 | Kale et al. | |
| 2017/0068646 A1 | 3/2017 | Beechuk et al. | |
| 2017/0345426 A1 | 11/2017 | Komissarchik et al. | |
| 2018/0089585 A1 | 3/2018 | Rickard, Jr. et al. | |
| 2018/0096250 A1 | 4/2018 | Rickard, Jr. et al. | |
| 2018/0096372 A1 | 4/2018 | Rickard, Jr. et al. | |
| 2019/0089229 A1 | 3/2019 | Sameshima et al. | |
| 2019/0095054 A1 | 3/2019 | Peng et al. | |
| 2019/0138650 A1 | 5/2019 | Snider et al. | |
| 2020/0065511 A1 | 2/2020 | Rickard, Jr. et al. | |
| 2020/0097496 A1 | 3/2020 | Alexander et al. | |
| 2020/0097544 A1 | 3/2020 | Alexander et al. | |
| 2020/0097563 A1 | 3/2020 | Alexander et al. | |
| 2020/0097600 A1 | 3/2020 | Sakhuja et al. | |
| 2020/0097608 A1 | 3/2020 | Xiu et al. | |
| 2020/0097809 A1 | 3/2020 | Velasco et al. | |
| 2020/0117671 A1 | 4/2020 | Govindarajan et al. | |
| 2020/0233874 A1 | 7/2020 | Chittar et al. | |
| 2021/0150144 A1 | 5/2021 | Kale et al. | |
| 2021/0272563 A1* | 9/2021 | Iwase | G06F 40/30 |

OTHER PUBLICATIONS

U.S. Appl. No. 17/099,083, Notice of Allowance mailed Aug. 14, 2023, 12 pgs.

* cited by examiner

SECURE COMPLETE PHRASE UTTERANCE RECOMMENDATION SYSTEM

CROSS-REFERENCE TO RELATED APPLICATIONS

This application is a continuation of, and claims priority to, and commonly assigned U.S. patent application Ser. No. 17/099,083, by Anuprit Kale et. al, titled "SECURE COMPLETE PHRASE UTTERANCE RECOMMENDATION SYSTEM, filed Nov. 16, 2020, which claims priority to Provisional U.S. Patent Application No. 62/936,967, by Anuprit Kale, titled "PROCESSING UTTERANCE DATA", filed Nov. 18, 2019, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to databases and more specifically to machine learning techniques to configure text recommendation systems.

BACKGROUND

Computing systems may be configured to provide text recommendations based on text already entered by a user. The recommendations are typically determined from a database of different responses. Recommendations that more accurately predict a user's response increases user convenience.

BRIEF DESCRIPTION OF THE DRAWINGS

The included drawings are for illustrative purposes and serve only to provide examples of possible structures and operations for the disclosed inventive systems, apparatus, methods and computer program products for machine learning intent classification. These drawings in no way limit any changes in form and detail that may be made by one skilled in the art without departing from the spirit and scope of the disclosed implementations.

DETAILED DESCRIPTION

Figure 1:
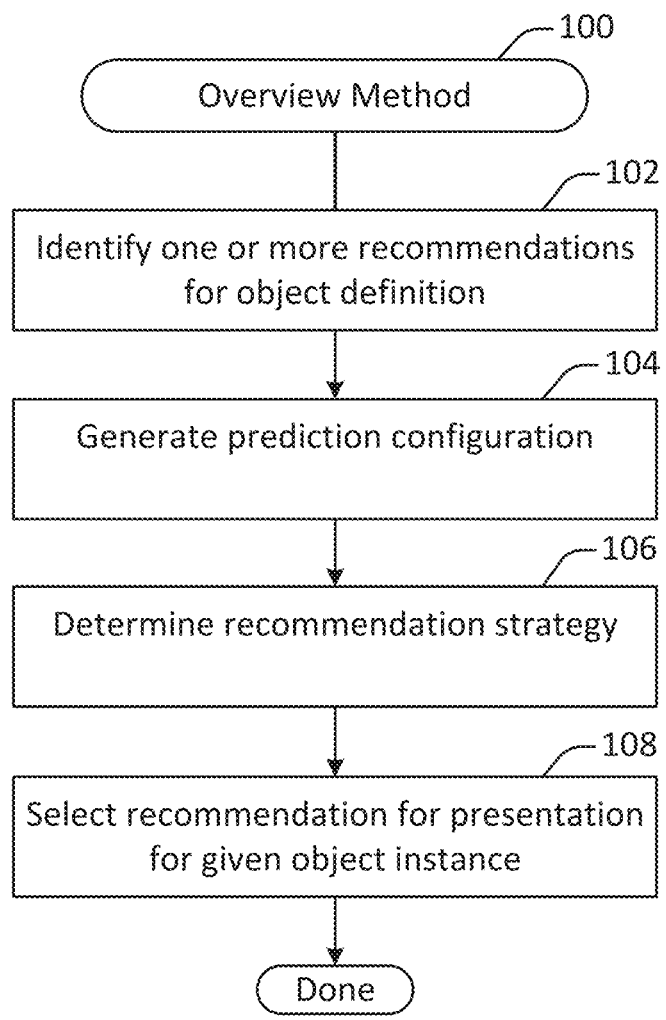
FIG. 1 illustrates an example of a method for dynamically ranking recommendation pairings for a given object instance, performed in accordance with one or more implementations.

Some implementations of the disclosed systems, apparatus, methods and computer program products are configured for machine learning to provide text recommendations. In certain implementations, the techniques described herein allow for a system to provide more accurate recommendations due to machine learning of intents and contexts of user messages.

In certain implementations described herein, machine learning systems may be trained with historical utterance sentences. The historical utterance sentences may be sentences that users have previously entered and are stored within a database. The historical utterance sentences may be utilized to train a machine learning model to provide text recommendations. The machine learning system may be trained to determine intent and context behind a user's messages.

The machine learning system may, in certain implementations, convert each utterance sentence into a vector. The vector may be configured so that sentences with similar vectors may indicate a higher likelihood of being similar utterances (e.g., may be more likely to match what a user intends to input). Thus, the vector may allow for a user input to be matched with sentences predicted to be likely sentences that the user wishes to complete.

Vectors allow for conveying a plurality of different factors behind each utterance. Thus, for example, various elements of a vector associated with an utterance may be directed to 1) a sentence structure that the utterance is typically used in, 2) the intent behind the utterance (e.g., command, question, or remark), 3) an emotion of the user providing the utterance, and/or other such context. In various embodiments, different weights may be imparted to different vectors when determining recommendations. Indeed, as the user's inputted phrase is also converted into a vector, the weights imparted to the vectors may change based on the vector of the user's inputted phrase.

Typically, data used to train machine learning systems or match to user inputs are data input from an operator instead of historical utterances and, thus, not subject to a high level of security. Historical utterances allow for more accurate training of machine learning systems are they are utterances actually used by users. However, historical utterances, being user conversations, must be securely stored. Securely storing the historical utterances presents issues with quickly recalling the utterance for learning or suggestion.

In the implementations described herein, the historical utterances may be decoupled from their vectors and stored separately. As the vector by itself does not represent a security risk (as the vector itself does not include any messages), the vector is used to match a user input. Similar vectors may then be used to obtain their associated historical utterances and such historical utterances may be suggested.

Thus, in certain implementations described herein, the machine learning utilizes and/or generates a plurality of different outputs (e.g., in place of a typical model file). Such outputs include data directed to a vector and data directed to the utterance text. Additionally, a model file used in machine learning may be generated. In various implementations, the data directed to the vector may include a vector identification value and a model metrics file. The data directed to the utterance text may include a corresponding identification value so that the vector and the data directed to the utterance text are associated to allow access while the utterance text is securely stored (e.g., within a custom object or within a permanent storage base). User security may be further improved as sensitive user data is stripped out of the messages utilized for the machine learning process.

In certain embodiments, each of the utterances (e.g., phrases) may be associated with phrase unique identifiers and each of the vectors may be associated with vector unique identifiers. Each of the phrase unique identifiers may be matched with the associated vector unique identifiers. The phrases and the associated phrase identifiers may be securely stored within a phrase database and may be configured to be retrieved from the secure phrase database.

Figure 2:
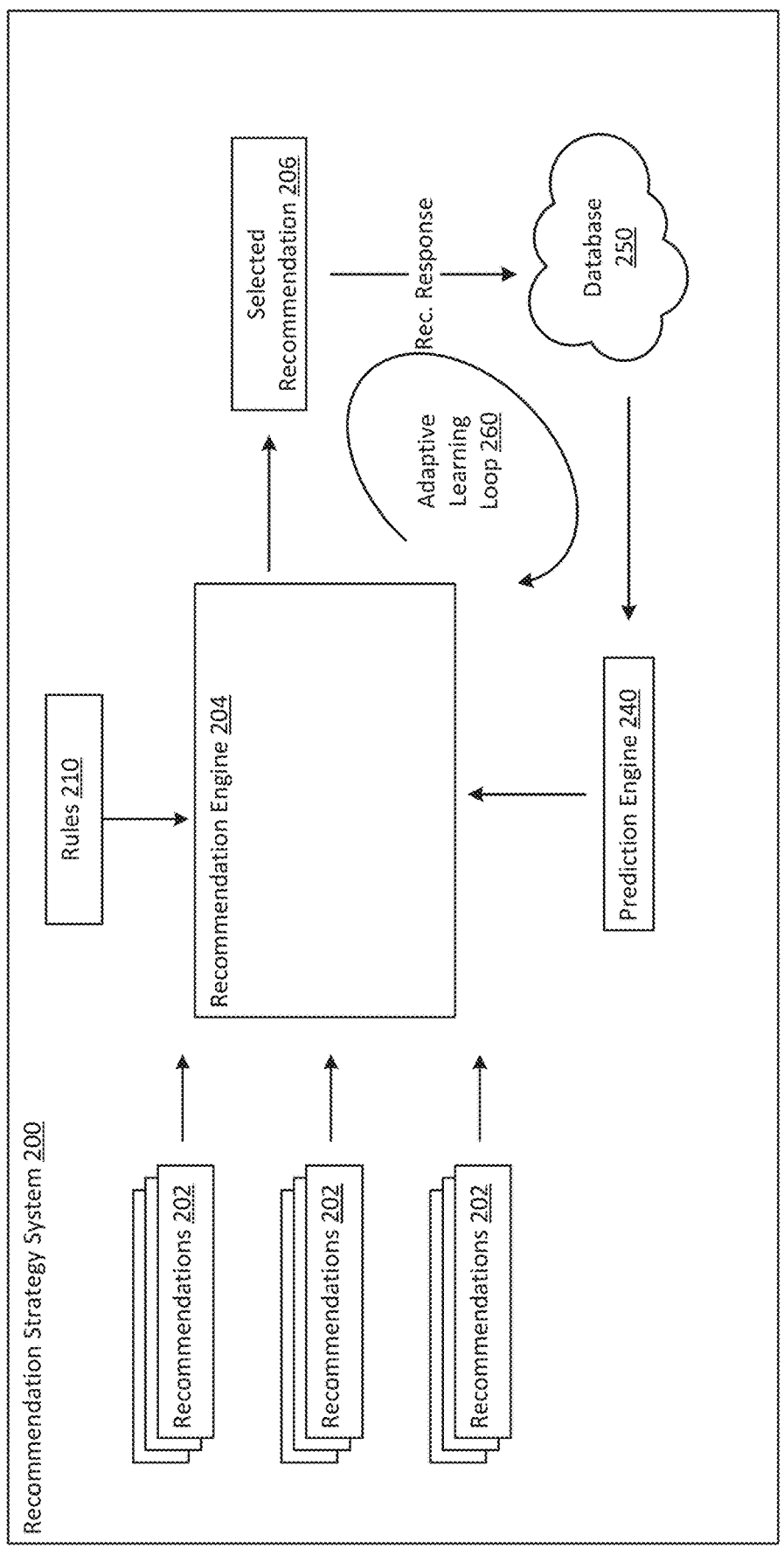
FIG. 2 shows a flowchart of an example recommendation strategy system, arranged in accordance with one or more implementations.

FIG. 1 illustrates an example of a method for dynamically ranking recommendation pairings for a given object instance, performed in accordance with one or more implementations. FIG. 2 shows a flowchart of an example recommendation strategy system, arranged in accordance with one or more implementations.

FIG. 1 illustrates an example of a method 100 for dynamically ranking recommendation pairings for a given object instance, in accordance with one or more implementations. FIG. 1 is described below in context of FIG. 2 which shows a flowchart of an example recommendation strategy system 200, in accordance with one or more implementations. At step 102, one or more recommendations, such as recommendations 202, are identified for an object definition (e.g., a user input). In various implementations, object definitions may be customized and defined by a user such as a system administrator, account administrator, or other such individual and may include, for example a user input that leads to selected recommendation 206 provided by recommendation engine 204. In various implementations, recommendations may include one or more words, phrases, sentences, or paragraphs that recommendation engine 204 predicts the user is planning to type.

At step 104, a prediction configuration is generated. According to various implementations, generation of a prediction configuration may involve identifying the types of information and data to collect and building of a prediction model from such information and data. A prediction engine, such as prediction engine 240, may be configured to generate a predictive model (or "prediction model") based on the prediction configuration. The configuration of a prediction engine is further described herein.

At step 106, a recommendation strategy is determined. As shown in FIG. 2, a recommendation strategy may be determined for recommendation engine 204, which comprises one or more rules 210. In certain implementations, rules 210 may include determination of vector values and/or creation of vector values such that certain vector values indicate a closeness of matching.

Recommendation engine 204 may further be associated with prediction engine 240 to further score and target the recommendations that satisfy rules 210. In this way, a more relevant recommendation may be selected for presentation for a given object instance at step 108, such as selected recommendation 206 shown in FIG. 2. Selected recommendations 206 may be presented to the user.

Recommendation responses to the recommendations may be stored in database 250. Such responses may be received by various mechanisms. In some implementations, a website or mobile application may track end consumer responses based on user activity of the end consumer on such website or mobile application. For example, a client application on a device of the user's may track the user's response to various recommendations. Such tracking may determine the recommendations selected by the user as relevant or accurate (e.g., by the user clicking on one or more recommendations). Additionally, recommendation engine 204 may store the amount of times that recommendations are provided and may determine the ratio between recommendations provided and recommendations accepted.

In some implementations database 250 is a table level distributed database system configured to store and associate the features with the respective object instances and recommended offers. The data stored in database 250 may be used as training data to dynamically update prediction engine 240 resulting in an adaptive learning loop 260. Data gathering for the prediction model is further described with reference to FIG. 7. As more training data is received, the prediction engine 240 is updated to allow for more accurate recommendations by recommendation engine 204.

Figure 3:
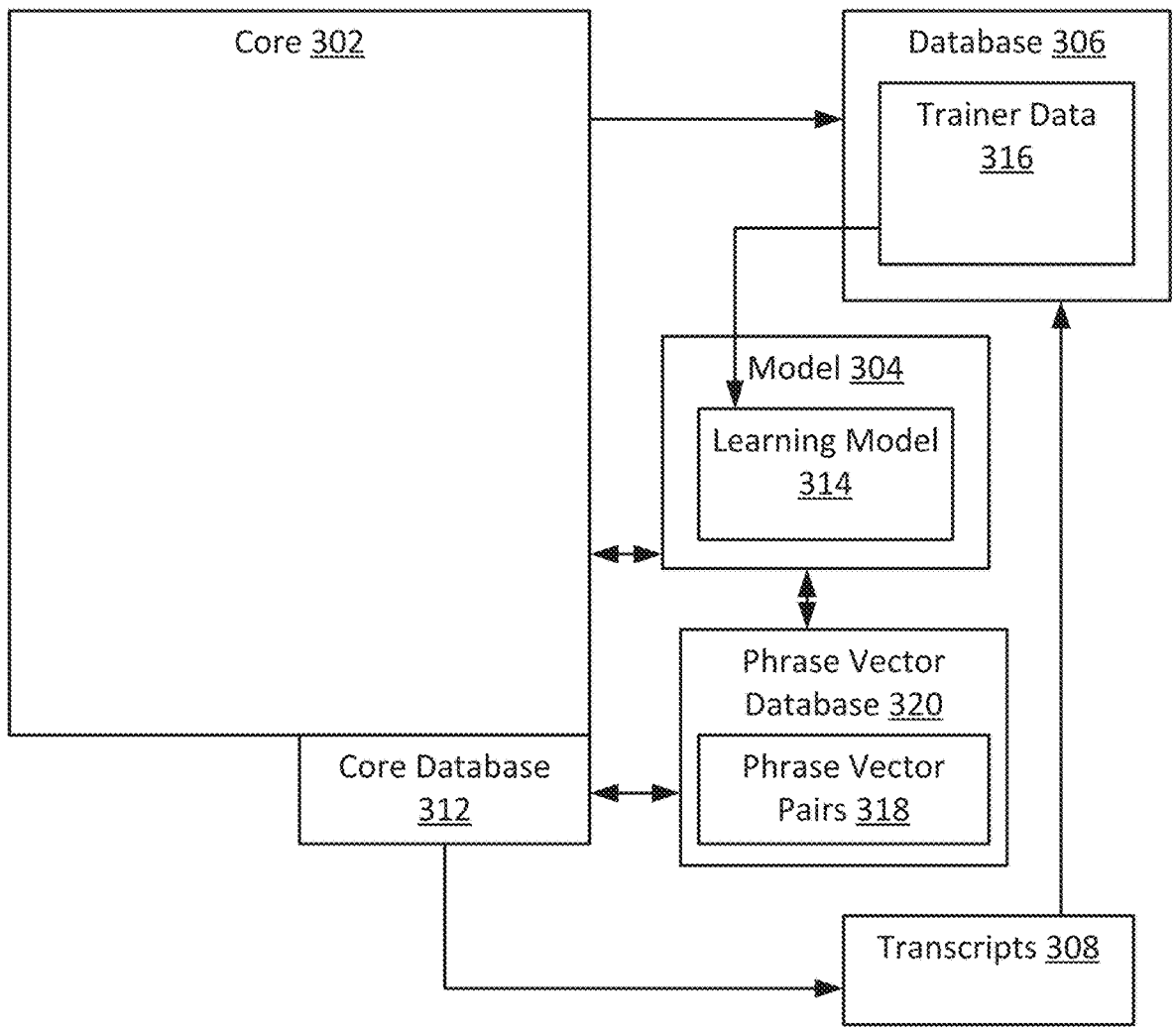
FIG. 3 illustrates a block diagram of a machine learning intent classification system, configured in accordance with one or more implementations.

FIG. 3 illustrates a block diagram of a machine learning intent classification system, configured in accordance with one or more implementations. FIG. 3 illustrates a system that includes core 302, model 304, database 306, and phrase vector database 320. Database 306 may include trainer data 316. Model 304 may include learning model 314.

In various embodiments, core 302 may be a computing system that controls operation and/or training of various portions the system of FIG. 3. Core 302 may include a core database 312 configured to store historical utterances from users. Thus, core database 312 may be encrypted and/or include security measures to protect user data. In certain embodiments, core database 312 may be an utterance database or a portion thereof.

Core 302 may trigger model training by providing instructions to database 306 and/or model 304. Training of model 304 may be performed by learning model 314. Learning model 314 may be trained from data of database 306, such as trainer data 316. In certain embodiments, database 306 may receive transcripts 308 containing historical utterances from core database 312, prepare the historical utterances for use by learning model 314 (e.g., by removing personally identifiable information from the historical utterances), and package together the various historical utterances as trainer data 316 to be used by learning model 314. Trainer data 316 may then be communicated to learning model 304.

Phrase vector database 320 may store phrase vectors. Each phrase vector may be associated with an utterance and/or one or more phrases. Core 302 may configure a bot to provide recommendations. The bots may be configured from model 304. Model 304 may output phrase vector pairs 318 based on machine learning. Phrase vector pairs 318 may be stored within phrase vector database 320, which may be configured to communicate with other devices or systems such as user devices. The phrase vector pairs 318 may include data identifying the utterance associated with the phrase vector (e.g., an identification number associated with the utterance). As such, phrase vector pairs 318 may allow for phrase vector database 320 to request certain utterances from core database 312 by providing the respective phrase vector and/or phrase vector pair. In certain embodiments, such request may additionally include authentication data (e.g., authenticating that phrase vector database 320 is authenticated and not an unauthorized third party). Such authentication data may include, for example, passwords, symbols, time dependent codes, two-factor authentication, and/or other such authentication techniques.

In certain examples, the phrase vector pairs 318 may be provided to core 302 and/or to core database 312 upon request. Core 302 may thus obtain inputs from a computing device of a user's or a testing agent, determine a vector associated with the inputs, provide the vector associated with the inputs to phrase vector database 320. Phrase vector database 320 may then determine one or more phrase vectors and/or the corresponding phrase vector pairs that match or closely match the vector associated with the inputs. Thus, for example, the vectors may include a direction and a magnitude. The phrase vectors that have a direction and/or magnitude closest to the vector associated with the inputs may be determined to match or closely match. Phrase vector database 320 may then provide such vectors and/or phrase vectors. Upon receiving the phrase vector and/or phrase vector pair, core 302 may then access the corresponding utterances in core database 312 and provide predictions (e.g., through the bot) based on the inputs and the data and models from core database 312 and model 304. Such a configuration prevents any user input from directly accessing actual utterance data, as the matching is performed through phrase vectors. Such a configuration thus allows for more secure data management.

In various embodiments, core 302 may provide feedback as to accuracy of the phrase vector pairs 318 output by model 304. Thus, for example, core 302 may obtain sample utterances when creating the bot. The vectors of the sample utterances may also be obtained with the utterances. Core 302 may, based on the model, determine which of the phrase vector pairs 318 are the closest matches for each of the sample utterances based on, for example, comparing the vectors of the sample utterances and the vectors of the phrase vector pairs 318. Core 302 may recommend the closest matches (e.g., the closest 25 to 100 matches) as recommendations for each sample utterance. Core 302 may then review, automatically or manually, the recommendations and provide feedback as to the accuracy of the recommendations.

Figure 4:
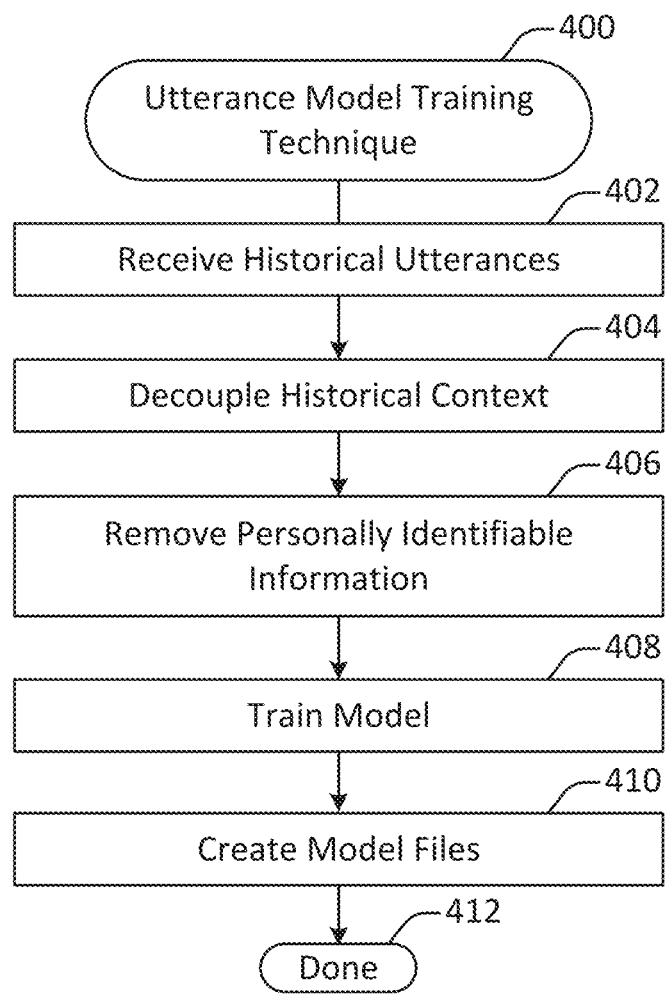
FIG. 4 shows a flowchart of an example utterance model training technique, arranged in accordance with one or more implementations.

FIG. 4 shows a flowchart of an example utterance model training technique, arranged in accordance with one or more implementations. FIG. 4 illustrates an utterance model training technique 400.

In step 402, historical utterances are received. In various embodiments, the historical utterances are received as a part of a dataset. The dataset may include a limited number of lines, words, or messages. The historical utterances may be user conversations. As the historical utterances may include sensitive user information, such as personally identifiable information and context specific information, care must be taken to protect the sensitive information within the historical utterances.

In step 404, the various historical utterances are decoupled from the historical context. For example, the historical utterances may include conversations with many different back and forth messages. Such messages may be decoupled from each other. Additionally, one or more of the messages may include a plurality of messages or phrases and each of the sentences or phrases may also be separated.

In step 406, personally identifiable information (e.g., names, passwords, account numbers, and other such information) may be removed from the messages. As personally identifiable information is not typically repeated regularly, vocabulary that is repeated fewer than a threshold number of times within the historical utterance dataset may be deemed to be personally identifiable information and removed. Furthermore, personally identifiable information may only be communicated between a limited number of users. Thus, vocabulary that is limited to a number of conversations below a threshold number (e.g., less than 2 to 5 conversations) or between a limited number of messengers may also be removed. In various embodiments, a machine learning model may be trained to remove such vocabulary that is below the threshold number or between a limited number of messengers.

In step 408, the data of the historical utterances is provided to train the machine learning model. Based on the training, model files are according created in step 410. In various embodiments, the model files may include a vector control model file to control which recommendations are provided based on user input.

For example, vectors allow for conveying a plurality of different factors behind each utterance, phrase, or input. In various embodiments, the vector may include a vector identification value and a model metrics portion. The vector identification value may identify the vector and, in certain embodiments, allow for a determination of which phrase or utterance the vector is associated with. The model metrics portion may include various elements representing aspects of the associated utterance or phrase such as sentence structure, intent, tone, emotion, context, formality, sentence type (e.g., declaration, request, question, or another type), and/or other aspects of the phrase or utterance. In certain embodiments, the vector may include one or more elements (e.g., magnitude, direction, and/or other elements). Thus, in a certain example, a vector may include three or more elements. Such elements may be directed to, for example, 1) a sentence structure that the utterance is typically used in, 2) the intent behind the utterance (e.g., command, question, or remark), 3) an emotion of the user providing the utterance, and/or other such context. In various embodiments, different weights may be imparted to different vectors when determining recommendations. Various models may be trained to determine such vector elements.

In certain embodiments, the various elements may be weighted and, thus, determining suggestions based on vectors may be according to the weights (e.g., a higher weighted element may be determined as more important in determining a match). Furthermore, as a user's input is converted into a vector, the weights imparted to the various elements of the vectors may change based the user's inputted phrase. As such, for example, if the emotion behind an input is determined to be humor, sentence structure may be weighted at a lower value due to the increased importance in sentence structure when providing humorous utterances.

Thus, for example, the vector control model file may control how vectors are matched and, thus, which utterances may be provided as recommendations. Furthermore, each utterance and vector may include identification numbers. The model file may include a file identifying the utterances based on the identification numbers and a file identifying the vectors based on the identification numbers. The model files may then be used to provide recommendations. The technique is then finished in step 412.

Figure 5:
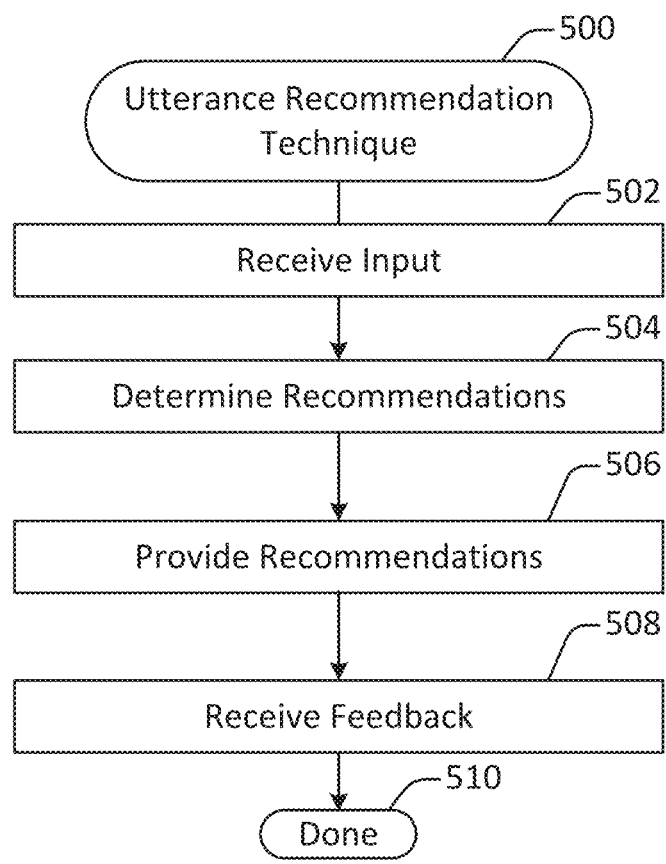
FIG. 5 shows a flowchart of an example utterance recommendation technique, arranged in accordance with one or more implementations.

FIG. 5 shows a flowchart of an example utterance recommendation technique, arranged in accordance with one or more implementations. FIG. 5 illustrates an utterance recommendation technique 500. In step 502, an input is received from a user. The input may be a partially completed sentence typed by the user from a computing device (e.g., a desktop or mobile device).

Upon receiving the input, a recommendation may be determined to complete the sentence. The recommendation may be based on the models described herein. The recommendations may be determined by, for example, converting the input into a current vector and matching the vectors of historical utterances ("historical vectors") to the current vector. Such matching may include, for example, determining a vector value associated with the input and determining vectors associated with historical utterances that are closest in value to the vector value associated with the input. Based on the matching, a plurality of utterances may be provided as recommendations, with the closest matches indicated as such (e.g., provided earlier within a list).

The recommendations may then be communicated to the computing device of the user and provided in step 506. Thus, for example, a user interface such as a screen may provide the recommendations as a scrollable list for the user to select. In step 508, feedback may be received from the user. Such feedback may include, for example, overt feedback such as the user indicating that certain recommendations are inaccurate or may be determined feedback from tracking how often recommendations are selected based on the current vector. The technique is then finished in step 510.

Figure 6:
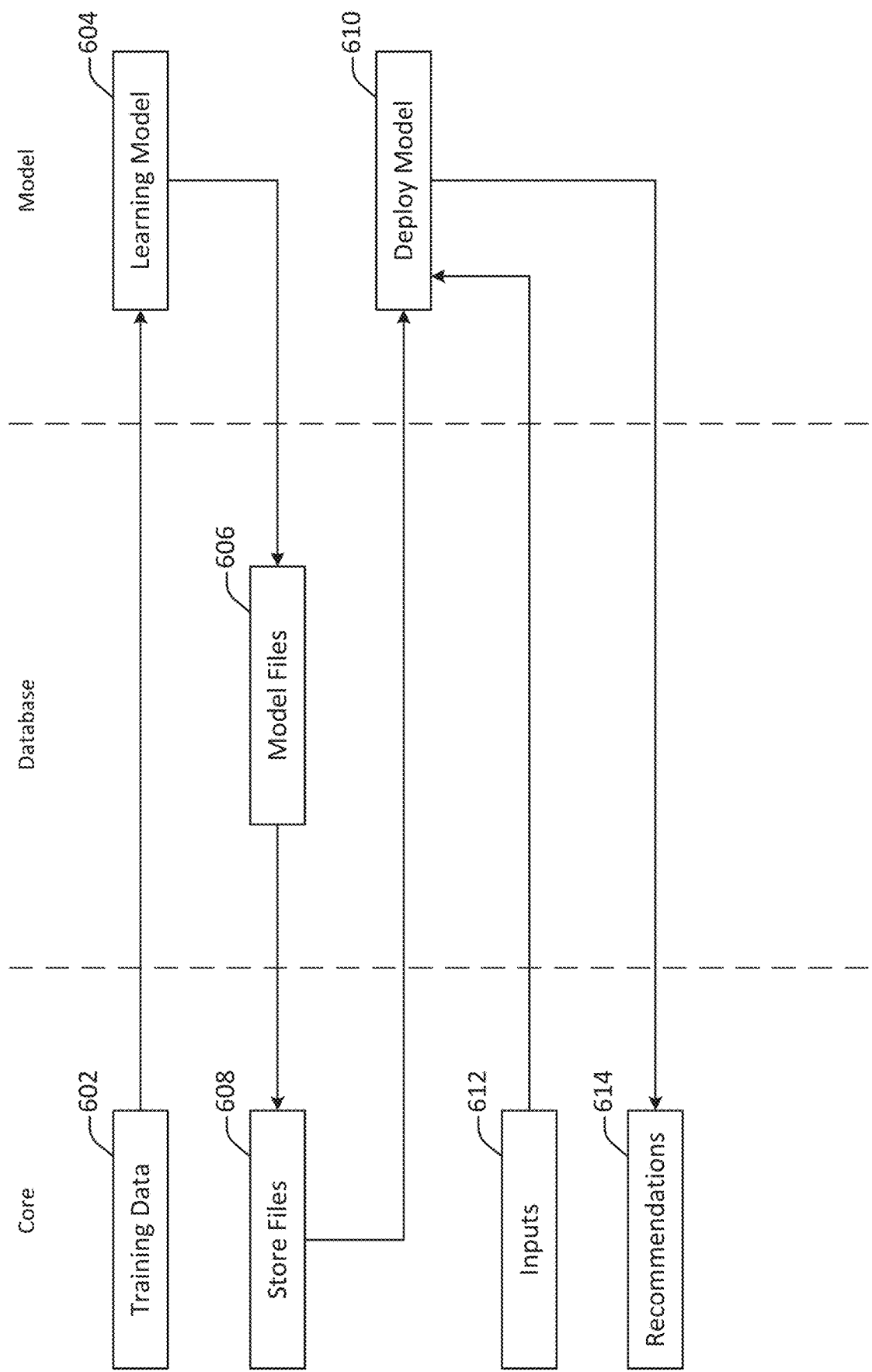
FIG. 6 illustrates a diagram of a recommendation technique, arranged in accordance with one or more implementations.

FIG. 6 illustrates a diagram of a recommendation technique, arranged in accordance with one or more implementations. FIG. 6 illustrates three columns, one each for actions performed by core 302, by database 306, and by model 304. In step 602, training data stored within core 302 is provided to learning model 314 of model 304. Training data may be data from historical utterances prepared as described herein.

Based on training data, learning model 314 is trained to associate vectors for each utterance within training data. The vectors and utterances may be assigned identification numbers. The identification numbers may allow for vectors and utterances to be associated with each other (e.g., may reference each other). Learning model 314 is thus generated in step 604. In various embodiments, the vectors and utterances may be associated by a bot trained with learning model 314. Learning model 314 then generates the model files in step 606 accordingly. The model files may include the utterances and the associated vectors.

In step 608, the model files that include the vectors and utterances are stored in core database 312. The recommendation model is then activated in step 610. The recommendation model may utilize the utterances and associated vectors described herein.

Such a recommendation model may, for example, receive a vector determined from user inputs, determine phrase vectors that are matches for the vector determined from user inputs, and provide recommendations based on the phrase vectors.

In step 612, a user input is received from, for example, a user device. The user input may be a partial phrase or sentence. The user input may be communicated to the recommendation model. The model may convert the input into a vector. Based on the vector, the model may select one or more recommended phrases or sentences that the model predicts the user may be typing.

Figure 7:
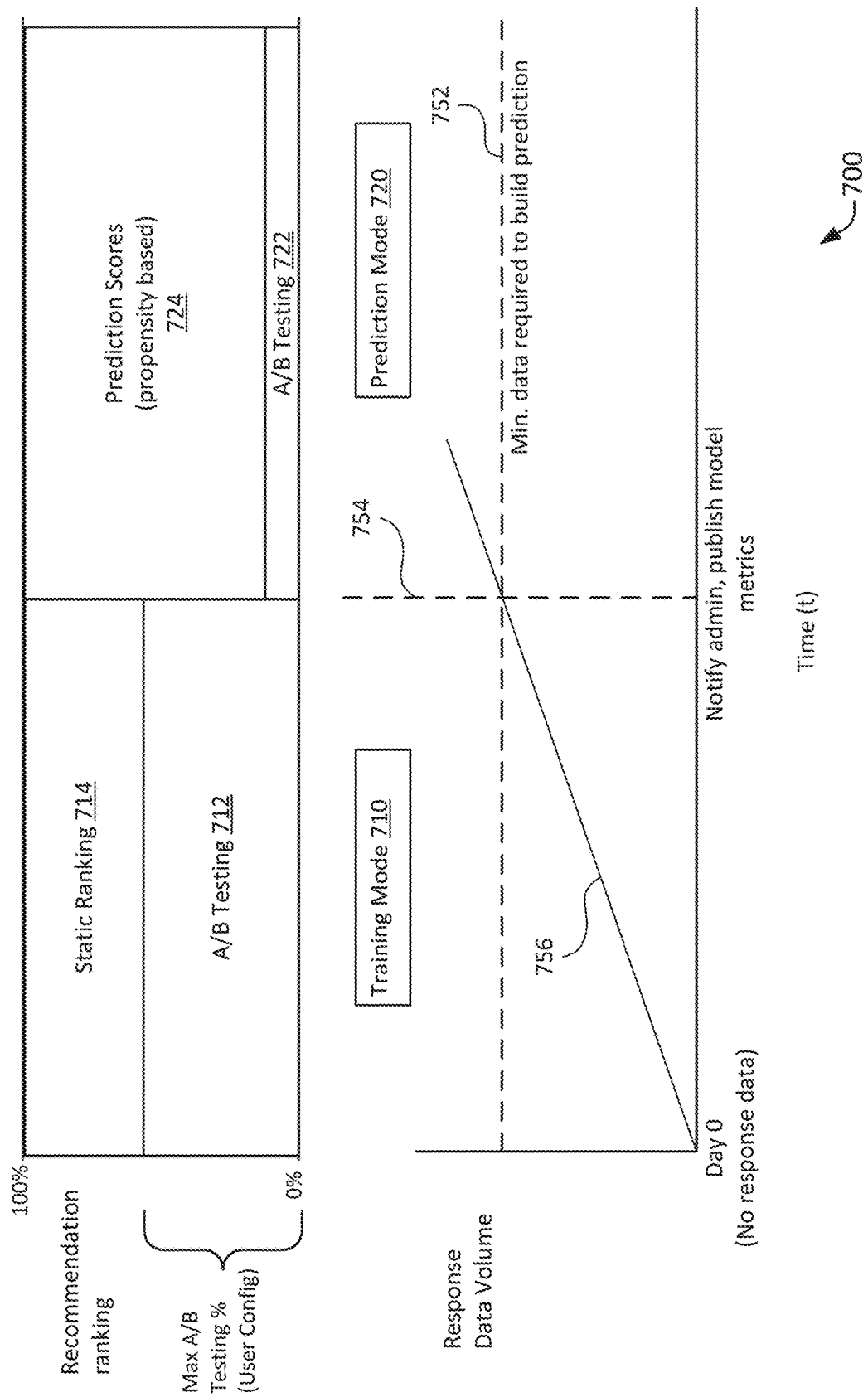
FIG. 7 shows a diagram and corresponding chart illustrating a predictive model training procedure, arranged in accordance with one or more embodiments.

FIG. 7 shows a diagram and corresponding chart illustrating a predictive model training procedure, arranged in accordance with one or more embodiments. FIG. 7, shown is a diagram 700 illustrating a predictive model training procedure, in accordance with one or more embodiments. The diagram 700 plots response data volume on the Y-axis against time (t) on the X-axis. Line 756 represents the cumulative amount of response data received or identified by the recommendation strategy system, which is stored in a feature database. As shown by line 756, the response data volume increases as responses to recommendations are received over time. Although the response data volume shown by line 756 is represented as a linear function of time, the response data volume may increase at varying rates. Generally, the response data volume should increase with time. However, in some embodiments, the recommendation strategy system may purge or isolate data of a certain age or data that is determined to be irrelevant such that response data volume may decrease over a period of time in certain circumstances.

Dashed line 752 represents the threshold amount of data required by the prediction configuration to generate a prediction model. As used herein, dashed line 752 may also be referred to as data threshold 752. According to various embodiments, until data threshold 754 has been reached, the recommendation strategy system may operate in training mode 710 in which the prediction engine is not implemented in scoring recommendations. Data threshold 752 may be determined by the user or by a threshold prediction accuracy. For example, a user determining the prediction configuration may set the data threshold 752 to five thousand responses. As another example, the user may set a threshold prediction accuracy to 75%. Accordingly, the prediction configuration will continue to gather response data until the prediction model can correctly predict which recommendations will be accepted by a particular target object 75% of the time based on training data. In some embodiments, the prediction model is generated and updated with additional data during training mode 710 until it is deemed to be sufficiently trained. Thus, threshold 752 may not be a fixed amount because additional or less data may be required. Data threshold 752 may also be determined by any other suitable machine learning techniques.

In some embodiments, a minimum amount of data is also required to generate a prediction model during training mode 710. This minimum amount of data may also be predetermined and/or set by the user. For example, the prediction configuration may specify a minimum of five hundred responses for each recommendation associated with the prediction configuration before a prediction model is generated.

Once the amount response data 756 reaches data threshold 752, the prediction model may be made available to score recommendations in the associated recommendation strategy. This time point is depicted in FIG. 7 by line 754, which will be referred to herein as publish time 754. At publish time 754, the recommendation strategy system may begin operating in prediction mode 720. The user may also be notified and provided with published metrics of the prediction model.

In various embodiments, the prediction model may be generated using various machine learning techniques and algorithms. In some embodiments, the prediction model is associated with one or more computational layers of a neural network. In some embodiments, the prediction model may generate weighted coefficients applied to various object features to score particular recommendations.

Figure 8:
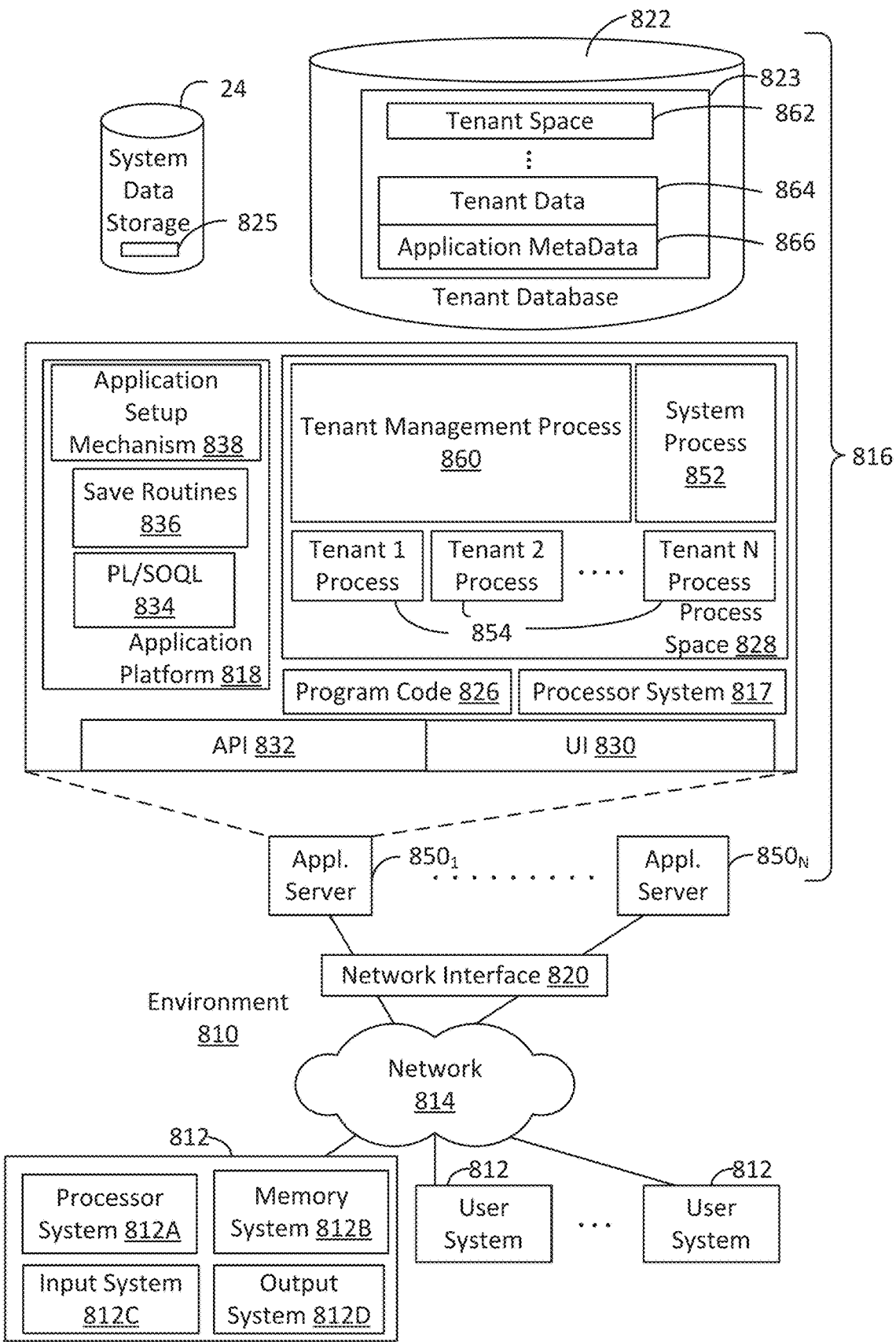
FIG. 8 shows a block diagram of an example of an environment that includes an on-demand database service configured in accordance with some implementations.

FIG. 8 shows a block diagram of an example of an environment that includes an on-demand database service configured in accordance with some implementations. FIG. 8 shows a block diagram of an example of an environment 810 that includes an on-demand database service configured in accordance with some implementations. Environment 810 may include user systems 812, network 814, database system 816, processor system 817, application platform 818, network interface 820, tenant data storage 822, tenant data 823, system data storage 824, system data 825, program code 826, process space 828, User Interface (UI) 830, Application Program Interface (API) 832, PL/SOQL 834, save routines 836, application setup mechanism 838, application servers 850-1 through 850-N, system process space 852, tenant process spaces 854, tenant management process space 860, tenant storage space 862, user storage 864, and application metadata 866. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 816, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 816. Such applications may be developed by the database service provider or by users or third-party application developers accessing the service. Application platform 818 includes an application setup mechanism 838 that supports application developers' creation and management of applications, which may be saved as metadata into tenant data storage 822 by save routines 836 for execution by subscribers as one or more tenant process spaces 854 managed by tenant management process 860 for example. Invocations to such applications may be coded using PL/SOQL 834 that provides a programming language style interface extension to API 832. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 866 for a subscriber making such an invocation. Such system processes may also manage execution of application metadata 866 as an application in a virtual machine.

In some implementations, each application server 850 may handle requests for any user associated with any organization. A load balancing function (e.g., an F5 Big-IP load balancer) may distribute requests to the application servers 850 based on an algorithm such as least-connections, round robin, observed response time, etc. Each application server 850 may be configured to communicate with tenant data storage 822 and the tenant data 823 therein, and system data storage 824 and the system data 825 therein to serve requests of user systems 812. The tenant data 823 may be divided into individual tenant storage spaces 862, which can be either a physical arrangement and/or a logical arrangement of data. Within each tenant storage space 862, user storage 864 and application metadata 866 may be similarly allocated for each user. For example, a copy of a user's most recently used (MRU) items might be stored to user storage 864. Similarly, a copy of MRU items for an entire tenant organization may be stored to tenant storage space 862. A UI 830 provides a user interface and an API 832 provides an application programming interface to system 816 resident processes to users and/or developers at user systems 812.

System 816 may implement a web-based recommendation system. For example, in some implementations, system 816 may include application servers configured to implement and execute recommendation software applications. The application servers may be configured to provide related data, code, forms, web pages and other information to and from user systems 812. Additionally, the application servers may be configured to store information to, and retrieve information from a database system. Such information may include related data, objects, and/or Webpage content. With a multi-tenant system, data for multiple tenants may be stored in the same physical database object in tenant data storage 822, however, tenant data may be arranged in the storage medium(s) of tenant data storage 822 so that data of one tenant is kept logically separate from that of other tenants. In such a scheme, one tenant may not access another tenant's data, unless such data is expressly shared.

Several elements in the system shown in FIG. 8 include conventional, well-known elements that are explained only briefly here. For example, user system 812 may include processor system 812A, memory system 812B, input system 812C, and output system 812D. A user system 812 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 812 to access, process and view information, pages and applications available from system 816 over network 814. Network 814 may be any network or combination of networks of devices that communicate with one another, such as any one or any combination of a LAN (local area network), WAN (wide area network), wireless network, or other appropriate configuration.

The users of user systems 812 may differ in their respective capacities, and the capacity of a particular user system 812 to access information may be determined at least in part by "permissions" of the particular user system 812. As discussed herein, permissions generally govern access to computing resources such as data objects, components, and other entities of a computing system, such as a recommendation system, a social networking system, and/or a CRM database system. "Permission sets" generally refer to groups of permissions that may be assigned to users of such a computing environment. For instance, the assignments of users and permission sets may be stored in one or more databases of System 816. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 816 may provide on-demand database service to user systems 812 using an MTS arrangement. By way of example, one tenant organization may be a company that employs a sales force where each salesperson uses system 816 to manage their sales process. Thus, a user in such an organization may maintain contact data, leads data, customer follow-up data, performance data, goals and progress data, etc., all applicable to that user's personal sales process (e.g., in tenant data storage 822). In this arrangement, a user may manage his or her sales efforts and cycles from a variety of devices, since relevant data and applications to interact with (e.g., access, view, modify, report, transmit, calculate, etc.) such data may be maintained and accessed by any user system 812 having network access.

When implemented in an MTS arrangement, system 816 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 816 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 816 may also maintain system-level data usable by multiple tenants or other data. Such system-level data may include industry reports, news, postings, and the like that are sharable between tenant organizations.

In some implementations, user systems 812 may be client systems communicating with application servers 850 to request and update system-level and tenant-level data from system 816. By way of example, user systems 812 may send one or more queries requesting data of a database maintained in tenant data storage 822 and/or system data storage 824. An application server 850 of system 816 may automatically generate one or more SQL statements (e.g., one or more SQL queries) that are designed to access the requested data. System data storage 824 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 9A:
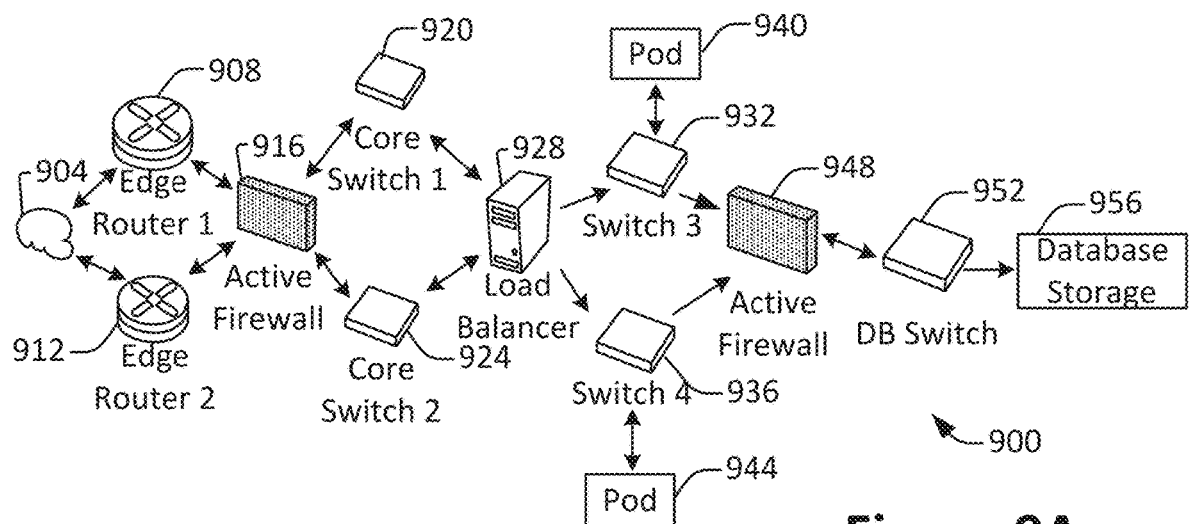
FIGS. 9A and 9B illustrate examples of a computing system, configured in accordance with one or more implementations.
Figure 9B:
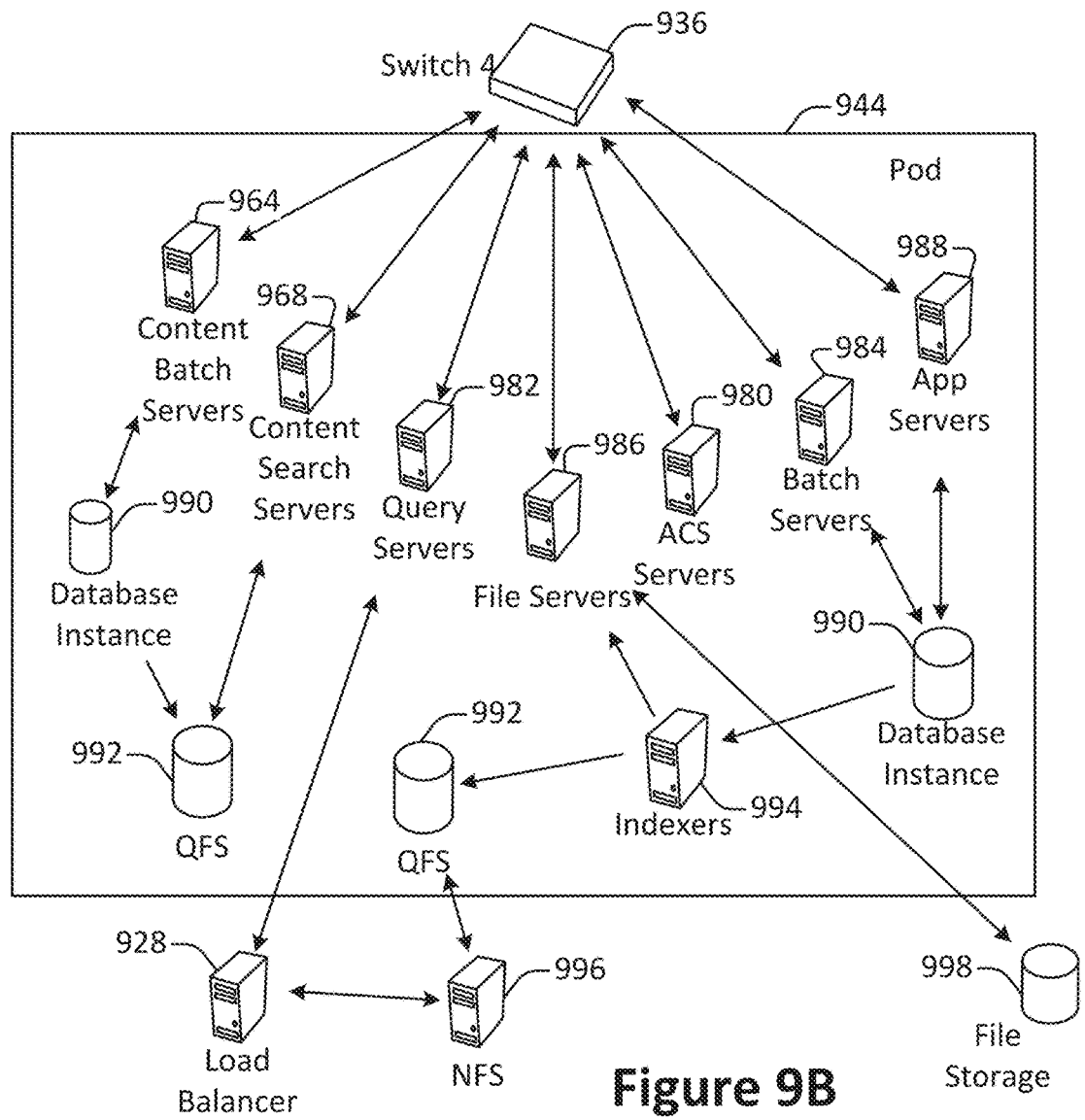

FIGS. 9A and 9B illustrate examples of a computing system, configured in accordance with one or more implementations. FIG. 9A shows a system diagram of an example of architectural components of an on-demand database service environment 900, configured in accordance with some implementations. A client machine located in the cloud 904 may communicate with the on-demand database service environment via one or more edge routers 908 and 912. A client machine may include any of the examples of user systems ?12 described above. The edge routers 908 and 912 may communicate with one or more core switches 920 and 924 via firewall 916. The core switches may communicate with a load balancer 928, which may distribute server load over different pods, such as the pods 940 and 944 by communication via pod switches 932 and 936. The pods 940 and 944, which may each include one or more servers and/or other computing resources, may perform data processing and other operations used to provide on-demand services. Components of the environment may communicate with a database storage 956 via a database firewall 948 and a database switch 952.

Accessing an on-demand database service environment may involve communications transmitted among a variety of different components. The environment 900 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 9A and 9B.

The cloud 904 refers to any suitable data network or combination of data networks, which may include the Internet. Client machines located in the cloud 904 may communicate with the on-demand database service environment 900 to access services provided by the on-demand database service environment 900. By way of example, client machines may access the on-demand database service environment 900 to retrieve, store, edit, and/or process recommendation information.

In some implementations, the edge routers 908 and 912 route packets between the cloud 904 and other components of the on-demand database service environment 900. The edge routers 908 and 912 may employ the Border Gateway Protocol (BGP). The edge routers 908 and 912 may maintain a table of IP networks or 'prefixes', which designate network reachability among autonomous systems on the internet.

In one or more implementations, the firewall 916 may protect the inner components of the environment 900 from internet traffic. The firewall 916 may block, permit, or deny access to the inner components of the on-demand database service environment 900 based upon a set of rules and/or other criteria. The firewall 916 may act as one or more of a packet filter, an application gateway, a stateful filter, a proxy server, or any other type of firewall.

In some implementations, the core switches 920 and 924 may be high-capacity switches that transfer packets within the environment 900. The core switches 920 and 924 may be configured as network bridges that quickly route data between different components within the on-demand database service environment. The use of two or more core switches 920 and 924 may provide redundancy and/or reduced latency.

In some implementations, communication between the pods 940 and 944 may be conducted via the pod switches 932 and 936. The pod switches 932 and 936 may facilitate communication between the pods 940 and 944 and client machines, for example via core switches 920 and 924. Also or alternatively, the pod switches 932 and 936 may facilitate communication between the pods 940 and 944 and the database storage 956. The load balancer 928 may distribute workload between the pods, which may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948, which may act as a computer application firewall operating at the database application layer of a protocol stack. The database firewall 948 may protect the database storage 956 from application attacks such as structure query language (SQL) injection, database rootkits, and unauthorized information disclosure. The database firewall 948 may include a host using one or more forms of reverse proxy services to proxy traffic before passing it to a gateway router and/or may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, the database storage 956 may be an on-demand database system shared by many different organizations. The on-demand database service may employ a single-tenant approach, a multi-tenant approach, a virtualized approach, or any other type of database approach. Communication with the database storage 956 may be conducted via the database switch 952. The database storage 956 may include various software components for handling database queries. Accordingly, the database switch 952 may direct database queries transmitted by other components of the environment (e.g., the pods 940 and 944) to the correct components within the database storage 956.

FIG. 9B shows a system diagram further illustrating an example of architectural components of an on-demand database service environment, in accordance with some implementations. The pod 944 may be used to render services to user(s) of the on-demand database service environment 900. The pod 944 may include one or more content batch servers 964, content search servers 968, query servers 982, file servers 986, access control system (ACS) servers 980, batch servers 984, and app servers 988. Also, the pod 944 may include database instances 990, quick file systems (QFS) 992, and indexers 994. Some or all communication between the servers in the pod 944 may be transmitted via the switch 936.

In some implementations, the app servers 988 may include a framework dedicated to the execution of procedures (e.g., programs, routines, scripts) for supporting the construction of applications provided by the on-demand database service environment 900 via the pod 944. One or more instances of the app server 988 may be configured to execute all or a portion of the operations of the services described herein.

In some implementations, as discussed above, the pod 944 may include one or more database instances 990. A database instance 990 may be configured as an MTS in which different organizations share access to the same database, using the techniques described above. Database information may be transmitted to the indexer 994, which may provide an index of information available in the database 990 to file servers 986. The QFS 992 or other suitable filesystem may serve as a rapid-access file system for storing and accessing information available within the pod 944. The QFS 992 may support volume management capabilities, allowing many disks to be grouped together into a file system. The QFS 992 may communicate with the database instances 990, content search servers 968 and/or indexers 994 to identify, retrieve, move, and/or update data stored in the network file systems (NFS) 996 and/or other storage systems.

In some implementations, one or more query servers 982 may communicate with the NFS 996 to retrieve and/or update information stored outside of the pod 944. The NFS 996 may allow servers located in the pod 944 to access information over a network in a manner similar to how local storage is accessed. Queries from the query servers 922 may be transmitted to the NFS 996 via the load balancer 928, which may distribute resource requests over various resources available in the on-demand database service environment 900. The NFS 996 may also communicate with the QFS 992 to update the information stored on the NFS 996 and/or to provide information to the QFS 992 for use by servers located within the pod 944.

In some implementations, the content batch servers 964 may handle requests internal to the pod 944. These requests may be long-running and/or not tied to a particular customer, such as requests related to log mining, cleanup work, and maintenance tasks. The content search servers 968 may provide query and indexer functions such as functions allowing users to search through content stored in the on-demand database service environment 900. The file servers 986 may manage requests for information stored in the file storage 998, which may store information such as documents, images, basic large objects (BLOBS), etc. The query servers 982 may be used to retrieve information from one or more file systems. For example, the query system 982 may receive requests for information from the app servers 988 and then transmit information queries to the NFS 996 located outside the pod 944. The ACS servers 980 may control access to data, hardware resources, or software resources called upon to render services provided by the pod 944. The batch servers 984 may process batch jobs, which are used to run tasks at specified times. Thus, the batch servers 984 may transmit instructions to other servers, such as the app servers 988, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 10:
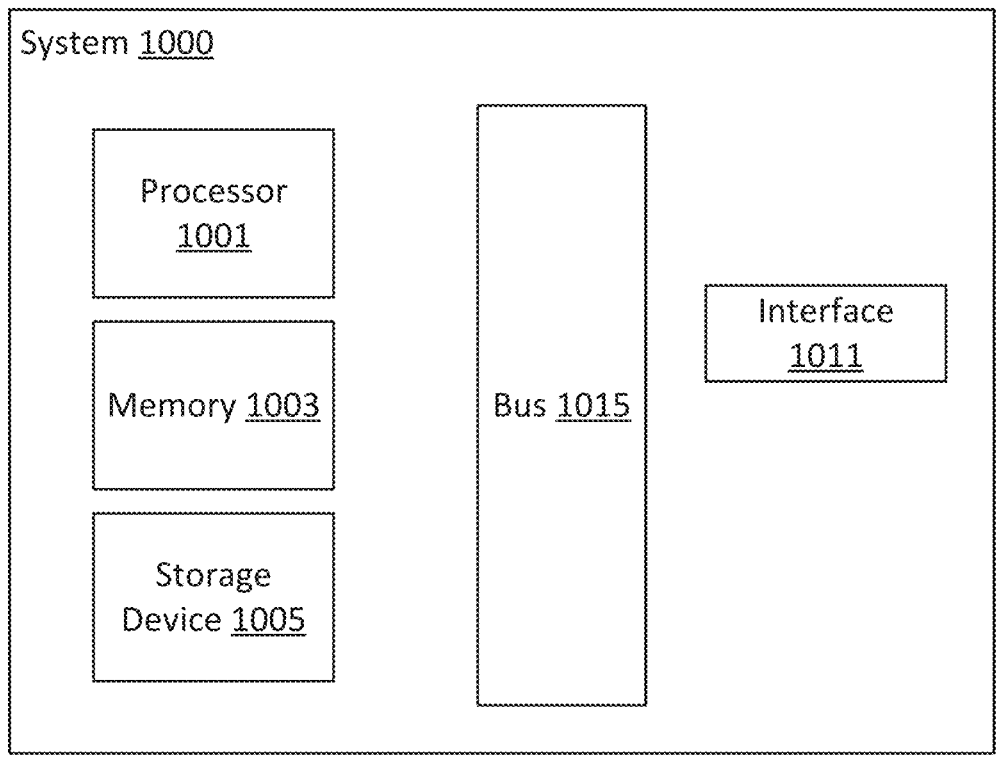
FIG. 10 illustrates one example of a computing device, configured in accordance with one or more implementations.

FIG. 10 illustrates one example of a computing device, configured in accordance with one or more implementations. FIG. 10 illustrates one example of a computing device. According to various embodiments, a system 1000 suitable for implementing embodiments described herein includes a processor 1001, a memory module 1003, a storage device 1005, an interface 1011, and a bus 1015 (e.g., a PCI bus or other interconnection fabric.) System 1000 may operate as a variety of devices such as an application server, a database server, or any other device or service described herein. Although a particular configuration is described, a variety of alternative configurations are possible. The processor 1001 may perform operations such as those described herein. Instructions for performing such operations may be embodied in the memory 1003, on one or more non-transitory computer readable media, or on some other storage device. Various specially configured devices can also be used in place of or in addition to the processor 1001. The interface 1011 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A database system, comprising:
   an utterance database configured to store utterance data associated with one or more utterance phrases;
   a phrase vector database configured to store phrase vector data comprising one or more phrase vectors, wherein each phrase vector is associated with a corresponding utterance phrase within the utterance database; and
   a processor configured to perform operations comprising:
      receiving an utterance dataset comprising a plurality of training phrases;
      decoupling each of the training phrases from the other of the training phrases;
      creating training data by:
         associating each of the training phrases with phrase unique identifiers;
         associating phrase vectors with each of the training phrases; and
         associating each of the phrase vectors with phrase vector unique identifiers, wherein each phrase vector unique identifier is matched with an associated phrase unique identifier;
      training a model with the training data;
      receiving entry data;
      determining, with the model, one or more phrase vectors matching the entry data;
      determining, based on the determined one or more phrase vectors, one or more utterance phrases associated with the one or more phrase vectors; and
      communicating the one or more utterance phrases to a user device for display on a graphical user interface of the user device.

2. The database system of claim 1, wherein the operations further comprise:
   determining, based on the model, an entry vector associated with the entry data.

3. The database system of claim 1, wherein the one or more utterance phrases are determined as recommendations by the model.

4. The database system of claim 1, wherein the determining, with the model, the one or more phrase vectors matching the entry data comprises matching one or more phrase vectors within the phrase vector database to the entry data.

5. The database system of claim 1, wherein the determining the one or more utterance phrases comprises requesting the utterances phrases associated with the determined one or more phrase vectors from the utterance database.

6. The database system of claim 5, wherein the determining the one or more utterance phrases comprises providing authentication data.

7. The database system of claim 1, wherein the operations further comprise:
   decoupling each of the training phrases from the other of the training phrases; and
   removing personally identifiable information from each of the training phrases.

8. The database system of claim 7, wherein the removing the personally identifiable information comprises:
   analyzing the utterance dataset to identify words present less than a threshold number of times within the utterance dataset; and
   removing the identified words.

9. The database system of claim 7, wherein the removing the personally identifiable information comprises:
   analyzing the utterance dataset to identify words present in conversations between a number of parties less than a threshold number; and
   removing the identified words.

10. The database system of claim 7, wherein the utterance database receives the utterance dataset.

11. A method comprising:
    receiving an utterance dataset comprising a plurality of training phrases;
    decoupling each of the training phrases from the other of the training phrases;
    creating training data by:
       associating each of the training phrases with phrase unique identifiers;
       associating phrase vectors with each of the training phrases; and
       associating each of the phrase vectors with phrase vector unique identifiers, wherein each phrase vector unique identifier is matched with an associated phrase unique identifier;
    training a model with the training data;
    receiving entry data;
    determining, with the model, one or more phrase vectors matching the entry data, wherein the one or more phrase vectors are each associated with a corresponding utterance phrase stored within an utterance database, and wherein the utterance database is configured to store utterance data associated with the one or more utterance phrases;
    determining, based on the determined one or more phrase vectors, one or more utterance phrases associated with the one or more phrase vectors; and
    communicating the one or more utterance phrases to a user device for display on a graphical user interface of the user device.

12. The method of claim 11, further comprising:
    determining, based on the model, an entry vector associated with the entry data.

13. The method of claim 11, wherein the one or more utterance phrases are determined as recommendations by the model.

14. The method of claim 11, wherein the determining with the model, the one or more phrase vectors matching the entry data comprises matching one or more phrase vectors within a phrase vector database to the entry data.

15. The method of claim 11, wherein the determining the one or more utterance phrases comprises requesting the utterances phrases associated with the determined one or more phrase vectors from the utterance database.

16. The method of claim 15, wherein the determining the one or more utterance phrases comprises providing authentication data.

17. The method of claim 11, further comprising:
    decoupling each of the training phrases from the other of the training phrases; and
    removing personally identifiable information from each of the training phrases.

18. The method of claim 17, wherein the removing the personally identifiable information comprises:
    analyzing the utterance dataset to identify words present less than a threshold number of times within the utterance dataset; and
    removing the identified words.

19. The method of claim 17, wherein the removing the personally identifiable information comprises:
    analyzing the utterance dataset to identify words present in conversations between a number of parties less than a threshold number; and
    removing the identified words.

20. The method of claim 17, wherein the utterance database receives the utterance dataset.

* * * * *